United States Patent
Sano et al.

(10) Patent No.: US 7,167,879 B2
(45) Date of Patent: Jan. 23, 2007

(54) NETWORK AV SYSTEM

(75) Inventors: Toshinobu Sano, Neyagawa (JP);
Susumu Takemura, Neyagawa (JP);
Yasushi Ikeda, Neyagawa (JP)

(73) Assignee: Onkyo Corporation, Neyagawa (JP)

( * ) Notice: Subject to any disclaimer, the term of this patent is extended or adjusted under 35 U.S.C. 154(b) by 0 days.

(21) Appl. No.: 10/963,107

(22) Filed: Oct. 12, 2004

(65) Prior Publication Data

US 2005/0086284 A1 Apr. 21, 2005

(30) Foreign Application Priority Data

Oct. 15, 2003 (JP) .............................. 2003-354522

(51) Int. Cl.
*G06F 17/30* (2006.01)
*G06F 15/16* (2006.01)
*H04R 5/00* (2006.01)

(52) U.S. Cl. .................. 707/204; 707/10; 707/200; 707/201; 707/202; 707/203; 707/205; 709/227; 709/228; 381/1

(58) Field of Classification Search .................. 707/10, 707/200, 201, 202, 203, 204, 205; 709/219, 709/227, 228; 381/1
See application file for complete search history.

(56) References Cited

U.S. PATENT DOCUMENTS 5,826,253 A * 10/1998 Bredenberg .................... 707/2
5,892,915 A * 4/1999 Duso et al. .................. 709/219
6,680,675 B1 * 1/2004 Suzuki ...................... 340/988

2002/0073205 A1 * 6/2002 Mostafa ...................... 709/227
2002/0150387 A1 * 10/2002 Kunii et al. ................... 386/83
2002/0184630 A1 12/2002 Nishizawa et al.
2003/0076963 A1 * 4/2003 Wells ............................ 381/1
2003/0078806 A1 4/2003 Kudryk et al.
2005/0209927 A1 * 9/2005 Aaltonen et al. ............. 705/26

FOREIGN PATENT DOCUMENTS

| JP | 07-160511 | 6/1995 |
| JP | 2000-115165 | 9/1998 |
| JP | 2000-113176 | 4/2000 |
| JP | 2001-350667 | 12/2001 |
| JP | 2002-073455 | 3/2002 |

(Continued)

OTHER PUBLICATIONS

U.S. Appl. No. 10/909,109, filed Jul. 29, 2004.

(Continued)

*Primary Examiner*—Thuy N. Pardo
(74) *Attorney, Agent, or Firm*—Renner, Otto, Boisselle & Sklar, LLP

(57) ABSTRACT

An uploader transmits to a server a request start notification indicating the start of a registration request and then transmits to the server a plurality of registration requests for pieces of music piece data. Upon receiving the plurality of registration requests from the uploader, the server registers the pieces of music piece data in a database in an HDD. After transmitting all the registration requests, the uploader transmits to the server a request completion notification indicating the completion of the registration requests. The server transmits an updating notification to an audio client after receiving the request completion notification. Therefore, traffic between the server and the client can be reduced when the server updates the database.

7 Claims, 12 Drawing Sheets

FOREIGN PATENT DOCUMENTS

| | | |
|---|---|---|
| JP | 2002-169761 | 6/2002 |
| JP | 2002-170070 | 6/2002 |
| JP | 2002-215506 | 8/2002 |
| JP | 2002-297438 | 10/2002 |
| JP | 2002-312646 | 10/2002 |
| JP | 2002-351965 | 12/2002 |
| JP | 2003-016287 | 1/2003 |
| JP | 2003-037834 | 2/2003 |
| JP | 2003-085073 | 3/2003 |
| JP | 2003-131923 | 5/2003 |
| JP | 2003-150494 | 5/2003 |
| JP | 2003-066978 | 3/2005 |
| WO | 00/60504 | 10/2000 |
| WO | 03/039229 A | 5/2003 |
| WO | 03/058537 A1 | 7/2003 |
| WO | WO 03 102919 | 12/2003 |

OTHER PUBLICATIONS

Brunelli P., "Using FTP to Transfer Files—Unix/Unix", Jul. 9, 1990, pp. 1-3, XP002313627.

European Search Report dated Jan. 27, 2005, in connection with corresponding EP Application No. 04023836.2.

European Office Action for corresponding Application No. 04 023 836.2 dated Apr. 19, 2006.

Deturi M, "FTPWizard" Web Page, [Online] Oct. 10, 2003, Internet Archive Retrieved from the Internet. XP000863862.

* cited by examiner

NETWORK AV SYSTEM

BACKGROUND OF THE INVENTION

1. Field of the Invention

The present invention relates to a network AV (Audio/Video) system that can reproduce audio sounds or video images, and more particularly, to a network AV system including a server, a client capable of connecting to the server, and an uploader capable of connecting to the server.

2. Description of the Related Art

In recent years, network AV systems using a client-server system have been provided. International Publication No. WO03/102919 and Japanese Patent Application No. 2003-290384 disclose a network AV system including a server having a database storing a plurality of pieces of music piece data and an audio client connected to the server through a LAN (Local Area Network). The audio client requests the server to provide desired music piece data and the server distributes the requested music piece data to the audio client in response. The audio client then reproduces the music piece data distributed from the server.

In the network AV system, new music piece data is registered in the server by an uploader. The uploader can have the server register music piece data. The uploader is connected to the server through the network. When music piece data is registered in the server, the uploader transmits a registration request and music piece data to be registered to the server. The server receives the registration request and registers the transmitted music piece data in a database. The uploader may be discrete or included in another device such as a server. The server registers the music piece data transmitted from the uploader and transmits the information indicating that the database has been updated (hereinafter referred to as "updating notification") to the audio client.

The audio client receives the updating notification and obtains music piece information related to music piece data stored by the server. Herein, the music piece information refers to information to specify music piece data such as the title of the music piece and the artist and does not include the music piece data itself The audio client obtains the music piece information and requests the server to provide the desired music piece data based on the music piece information.

According to the conventional method, when a plurality of pieces of music piece data are registered in the server by the uploader, the server transmits an updating notification to the audio client every time data for one music piece is registered. More specifically, the server transmits updating notifications as many as the number of pieces of music piece data to be registered. This increases the traffic between the audio client and the server.

When the server registers a plurality of pieces of music piece data and the audio client receives a plurality of updating notifications, the audio client receives a new updating notification while it is in the process of obtaining music piece information in response to another updating notification. In this case, the audio client must stop obtaining the music piece information and must obtain the music piece information all over again. This also gives rise to increase in the traffic.

SUMMARY OF THE INVENTION

It is an object of the invention to provide a network AV system that allows the traffic between a server and a client to be reduced when the server updates a database.

A network AV system according to the invention includes a server having a database capable of storing a plurality of contents, an uploader capable of connecting to the server and having to the server to update the database, and a client capable of connecting to the server, receiving a content selected among the plurality of contents from the server, and reproducing the selected content. The uploader includes an updating requester and a completion notifier. The updating requester transmits to the server one or more updating requests to have the server to update the database. The completion notifier transmits a request completion notification to the server after the updating requesting means transmits the one or more updating requests. The server includes an updater and an updating notifier. The updater responds to the one or more updating requests to update the database. The updating notifier transmits to the client an updating notification indicating that the database has been updated after receiving the request completion notification. Herein, the updating refers to the operation of registering a new content in the database, changing a content in the database, or deleting a content in the database.

In the network AV system according to the invention, even when the updater updates the database, the server does not transmit an updating notification to the client before receiving a request completion notification from the uploader. Therefore, the traffic between the server and the client at the time of updating processing can be less than that by the conventional network AV system in which an updating notification is transmitted every time the database is updated. The uploader transmits a request completion notification after transmitting the one or more updating requests. Therefore, when the database is continuously updated, an updating notification can be transmitted to the client after the database is entirely updated.

Preferably, the client includes an obtainer and a requester. The obtainer obtains information related to the selected content from the server upon receiving the updating notification. The requester requests the server to provide the selected content based on the obtained information. Herein, the information related to the content is not the content itself but information to specify the content. When for example the content is music piece data, the title of the music piece or the name of the artist is information related to the content.

In the conventional case, when the server continuously updates the database, the client receives a new updating notification while it is in the process of obtaining information related to a content in response to another updating notification. Therefore, the client must stop obtaining the information and obtain the information all over again. The client according to the invention receives an updating notification from the server after the server updates the database entirely, and therefore no new updating notification is received during obtaining information. Consequently, the traffic can be reduced.

Preferably, the uploader further includes a start notifier. The start notifier transmits a request start notification to the server before the updating requester transmits the one or more updating requests. The updating notifier transmits an updating notification after receiving a request completion notification upon receiving the request start notification.

Preferably, the server further includes a determiner. The determiner determines whether or not the database has been updated. The updating notifier transmits an updating notification when the determiner determines that the database has been updated.

In this way, the server does not transmit an updating notification upon receiving a request completion notification if the database has not been updated. Therefore, the server does not transmit an updating notification if the uploader transmits a request completion notification without requesting updating by erroneous operation and the like.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
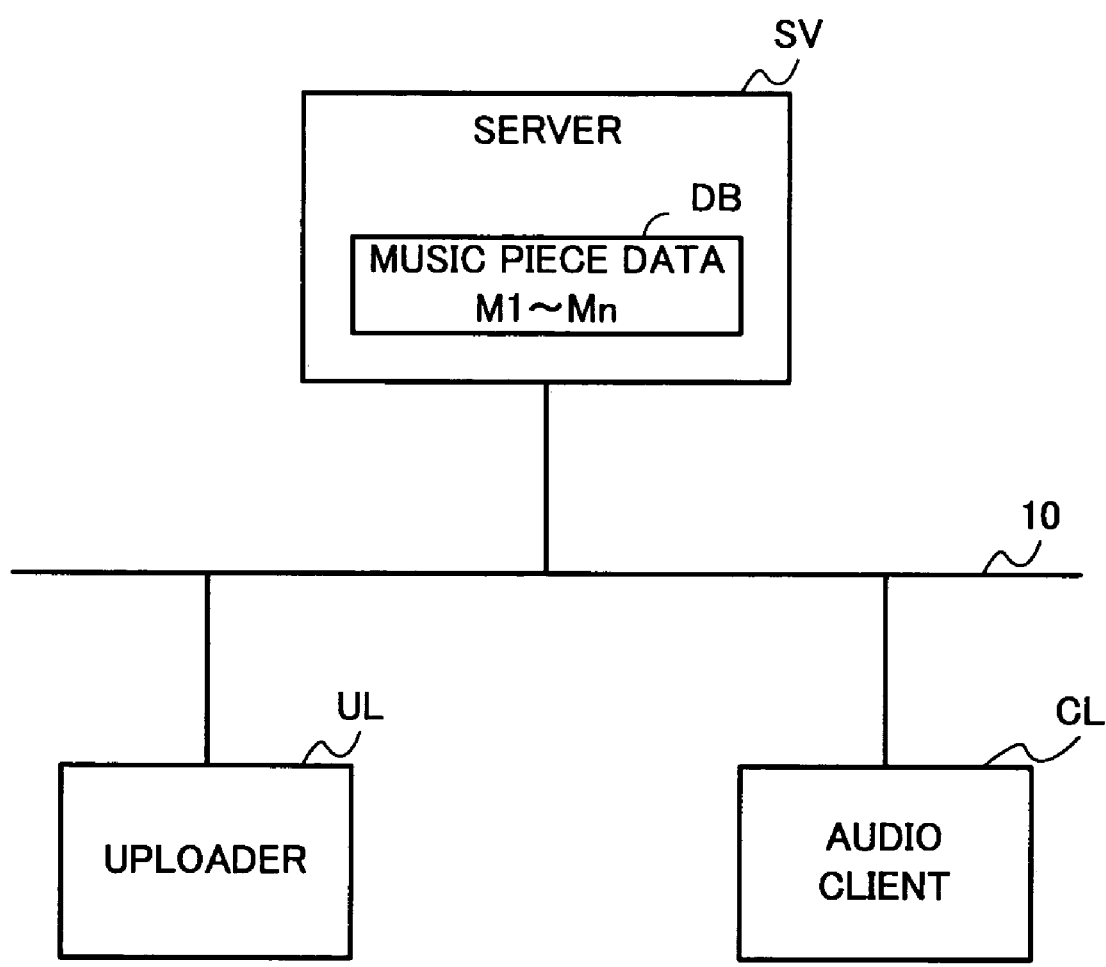
FIG. 1 is a functional block diagram of the configuration of a network AV system according to an embodiment of the invention.

An embodiment of the invention will be described in conjunction with the accompanying drawings, in which the same or corresponding portions are denoted by the same reference characters and their description will not be repeated.

1. Configuration of Network System

Referring to FIG. 1, a network AV system 1 includes a server SV, an audio client CL, and an uploader UL.

The server SV has a database DB that stores a plurality of pieces of music piece data M1 to Mn (n: natural number). The server SV responds to a request from the audio client CL and distributes music piece data selected by the user of the audio client CL among the music piece data M1 to M1n in the database DB to the audio client CL.

The audio client CL reproduces the music piece data distributed from the server SV. The audio client CL is connected to the server SV through a LAN 10.

The uploader UL has the server SV register new music piece data, change the content of music piece data Mn in the database DB, and delete music piece data Mn in the database DB. The uploader UL is connected to the server SV through the LAN 10.

FIG. 1 shows only one of each of these elements, the server SV, audio client CL and uploader UL, but there may be more than one each for these devices on LAN 10.

1.2. Configuration of Server

Figure 2:
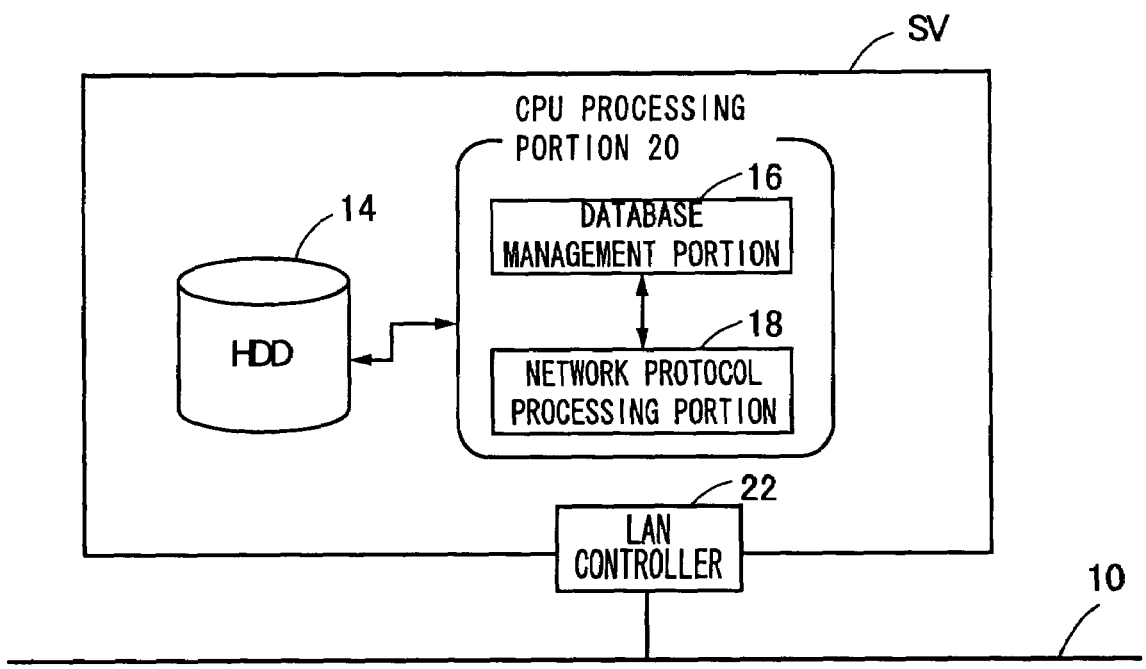
FIG. 2 is a functional block diagram of the configuration of the server in FIG. 1.

Referring to FIG. 2, the server SV includes an HDD (hard disk drive) 14, a CPU processing portion 20 including a database management portion 16 and a network protocol processing portion 18, and a LAN controller 22 that transmits/receives signals between the server SV and the LAN 10. The HDD 14 stores a database DB. The database DB stores a plurality of pieces of compressed digital music piece data M1 to Mn. The database management portion 16 manages the HDD 14. More specifically, in response to a request from the audio client CL, the portion selects desired music piece data Mn from the HDD 14. The management portion also registers new music piece data in the HDD 14 in response to a request from the uploader UL, changes music piece information for music piece data Mn in the HDD 14 as will be described or deletes music piece data Mn. The network protocol processing portion 18 carries out protocol processing to data input/output thereto/therefrom.

The HDD 14 stores a music list (Music List) ML as shown in Table 1.

TABLE 1

| Music List ML |
| --- |
| music piece information |
| music piece information I1 |
| music piece information I2 |
| . |
| . |
| . |
| music piece information In |

Referring to Table 1, the music list ML includes a plurality of pieces of music piece information I1 to In. These pieces of music piece information I1 to In are related to the music piece data M1 to Mn stored in the database DB in the HDD 14. Details of the music piece information In are given in Table 2.

TABLE 2

| Music Piece Information In | |
| --- | --- |
| Filename | file name |
| title | title of music piece |
| artist | artist's name |
| album | album title |
| genre | genre |
| length | length of music piece (time) |
| type | file format |
| songID | music piece ID |

Referring to Table 2, the music piece information In includes the file name, title, artist's name, album title, genre, length (time), file format and music piece ID of the music piece. As the file name, the full path of the HDD 14 storing the music piece data Mn is recorded.

The server SV also stores client information CLI (Client Information) as shown in Table 3 in the HDD 14. The client information CLI is related to a client device (such as an audio client CL and an uploader UL).

TABLE 3

| client information CLI | |
|---|---|
| flag | presence/absence of connection |
| type | client type |
| status | present status |
| volume | present volume |
| productid | product ID |
| firmwareid | firmware ID |
| hostname | client name |
| songID | music piece ID |
| curKey | list construction key |

Referring to Table 3, the term "flag" in the client information CLI represents the presence/absence of connection to the server SV When there is the connection, the "flag" is set, and otherwise the "flag" is reset. The term "type" represents the type of the client such as a client CL and an uploader UL. The term "status" represents the present status (operation state) such as reproducing, stopping, completion, pause, fast-forwarding, and rewinding. In the state "stopping," reproducing of a selected music piece is stopped midway in response to the operation by the audio client CL itself, or stopped midway in response to the operation by the controller. The term "completion" indicates that a selected music piece has been reproduced to the end in response to the operation by the controller. The term "volume" indicates the present volume (sound volume) value. The term "productid" indicates a product ID (machine information) provided for each client type. The same product ID is provided to clients CL of the same type. The audio client CL is provided with "1" for example and the uploader UL is provided with "2." The term "firmwareid" is a firmware ID indicating the version of firmware installed in the client device. The term "hostname" indicates a client name provided to the client device. The term "songID" indicates a music piece ID to identify the presently reproduced music piece. The term "curKey" indicates a list construction key necessary for producing a play list PL, a music list being presently reproduced. The play list PL will be detailed later.

The list construction key includes a filter kind and a keyword. The filter kind is based on a title, a genre, an artist name, an album title, a file name, or the like. If for example the filter kind is about an artist's name, the name of a desired artist is recorded as a keyword. A desired music list ML can be produced by searching through the HDD 14 using the list construction key, details of which are disclosed by International Publication No. WO03/102919 as described above.

Note that when the client device is an uploader UL, no information is registered as the "status," "volume," "songID," and "curKey" in Table 3.

1.3. Configuration of Audio Client

Figure 3:
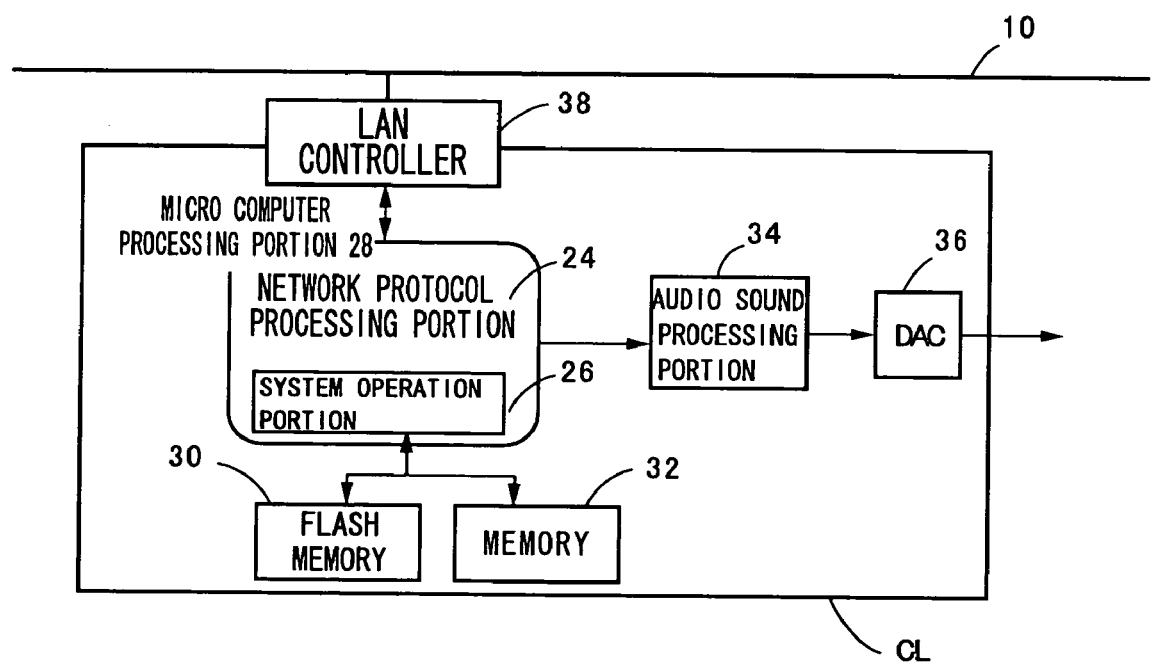
FIG. 3 is a functional block diagram of the configuration of the audio client CL in FIG. 1.

Referring to FIG. 3, the audio client CL includes a microcomputer processing portion 28 including a network protocol processing portion 24 and a system operation portion 26, a flash memory 30, a memory 32 that temporarily stores sequentially input, compressed digital music piece data and sequentially outputs the data, an audio sound processing portion 34 that decodes the compressed digital music piece data into non-compressed digital music piece data, a D/A converter (DAC) 36 that converts digital music piece data into analog music piece data, and a LAN controller 38 that transmits/receives signals between the audio client CL and the LAN 10. The system operation portion 26 controls the audio client CL as a whole.

The audio client CL does not include an HDD for storing music piece data Mn unlike the server SV.

1.4. Configuration of Uploader

Figure 4:
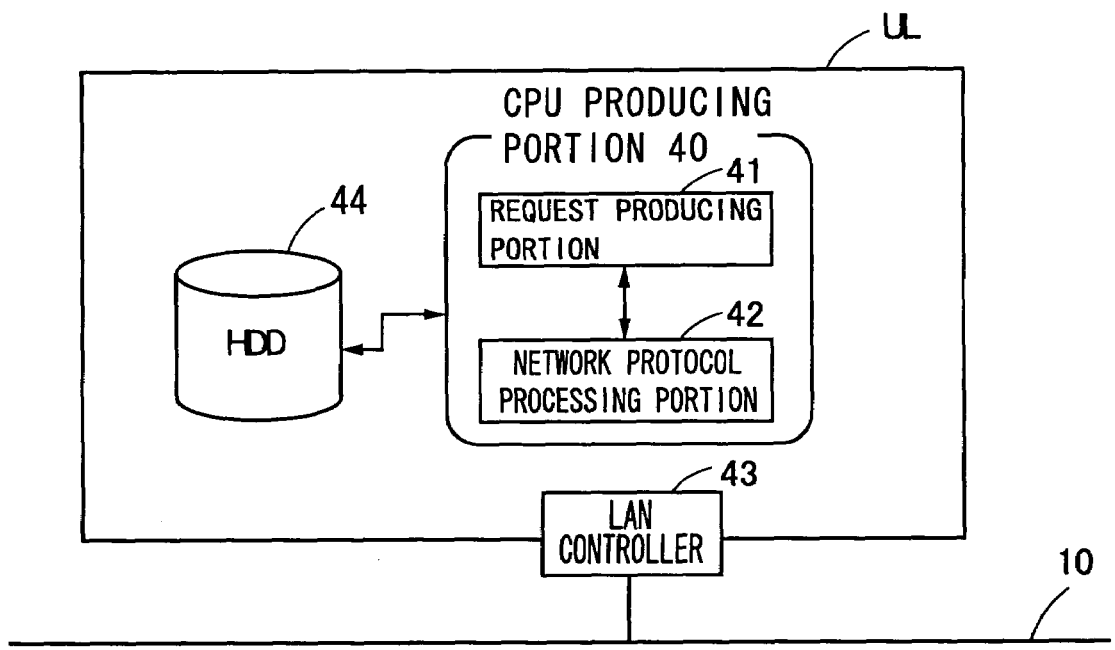
FIG. 4 is a functional block diagram of the configuration of the uploader in FIG. 1.

Referring to FIG. 4, the uploader UL includes a CPU processing portion 40 including a request producing portion 41 and a network protocol processing portion 42, an HDD 44 that stores one or more pieces of music piece data to be transmitted to the server SV, and a LAN controller 43 that transmits/receives signals between the uploader UL and the LAN 10. The request producing portion 41 produces an updating request for registering, changing, or deleting music piece data and a request start notification and a request completion notification that will be described. Note that the HDD 44 may be replaced by a memory.

2. Operation of Network AV System 2.1. When Uploader Has Server Register a Plurality of Pieces of Music Piece Data Referring to FIG. 5, in the network AV system 1 according to the embodiment, when the uploader UL has the server SV register a plurality of pieces of music piece data M10 to M1n, the uploader UL transmits to the server SV a request start notification indicating the start of the registration request ((1) in FIG. 5). Then, the uploader UL transmits to the server SV registration requests for music piece data M10 to Mn ((2) in FIG. 5). At the time, the uploader UL transmits a registration request for each piece of the music piece data. The server SV receives the plurality of registration requests from the uploader UL and registers the music piece data M10 to M1n in the database DB in the HDD 14 ((3) in FIG. 5).

Figure 5:
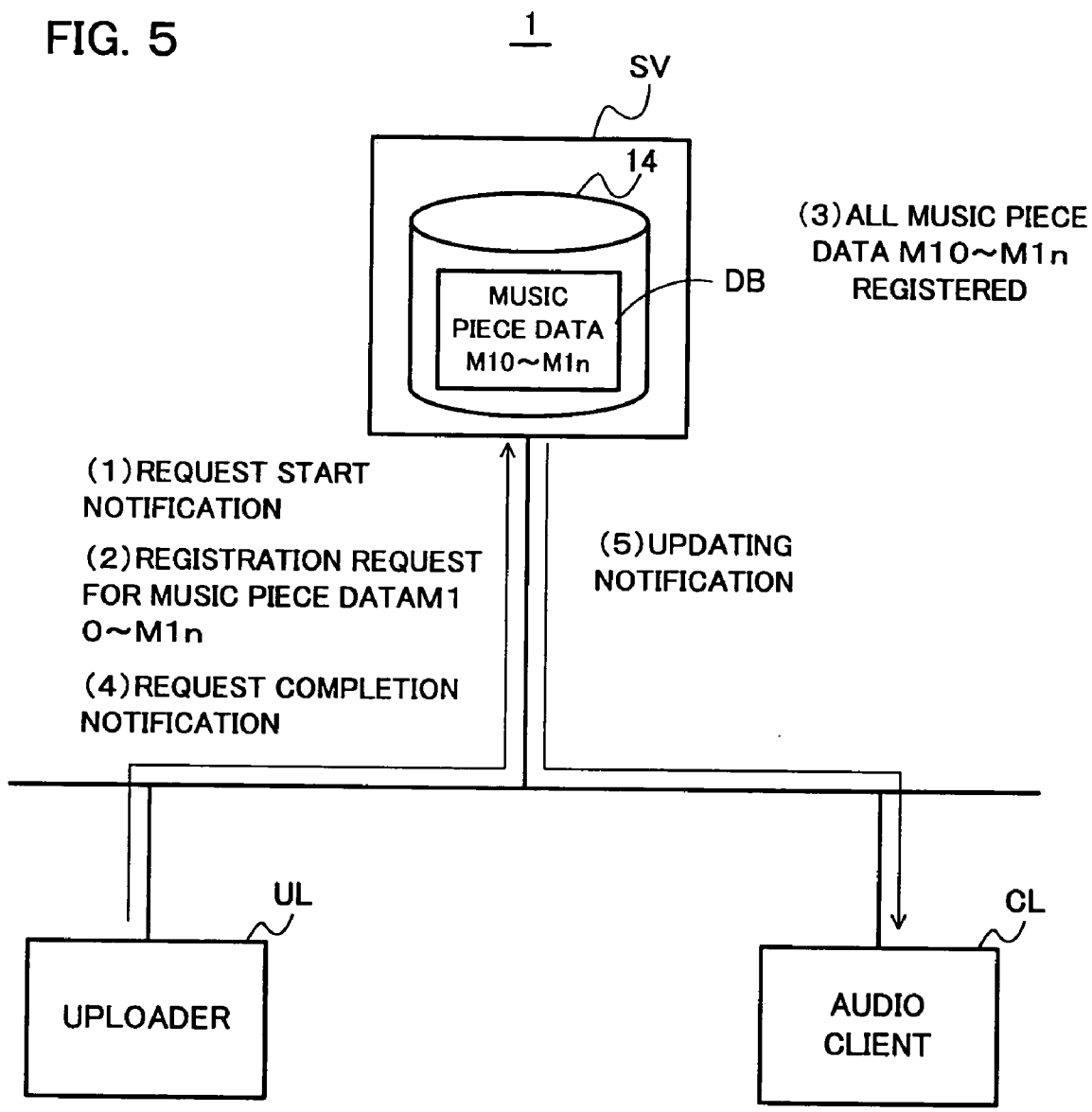
FIG. 5 is a schematic diagram for use in illustration of the operation of the network AV system in FIG. 1.

The uploader UL transmits all the registration requests for the music piece data M10 to M1n to be registered and then transmits to the server SV a request completion notification indicating the completion of the registration request ((4) in FIG. 5). The server SV receives the request completion notification from the uploader UL and transmits an updating notification to the audio client CL ((5) in FIG. 5).

When the pieces of music piece data M10 to M1n are continuously registered in the server SV, the conventional server SV transmits an updating notification every time one piece of music piece data M1n is registered. More specifically, the server SV registers the music piece data M10, then issues an updating notification, registers music piece data M11, then issues an updating notification, registers the music piece data M in and then issues an updating notification. In the network AV system according to the embodiment, the server SV transmits to the audio client CL only one updating notification after registering all the music piece data M10 to M1n. Consequently, the traffic between the server SV and the audio client CL is reduced, details of which will be described.

2.1.1. Connection Operation with Server

When the uploader UL has the server SV register music piece data M10 to M1n, the uploader UL first establishes connection with the server SV Now, the manner of how the uploader UL connects with the server SV will be described. The manner of connection processing also applies to the connection between an audio client CL and the server SV.

Figure 6:
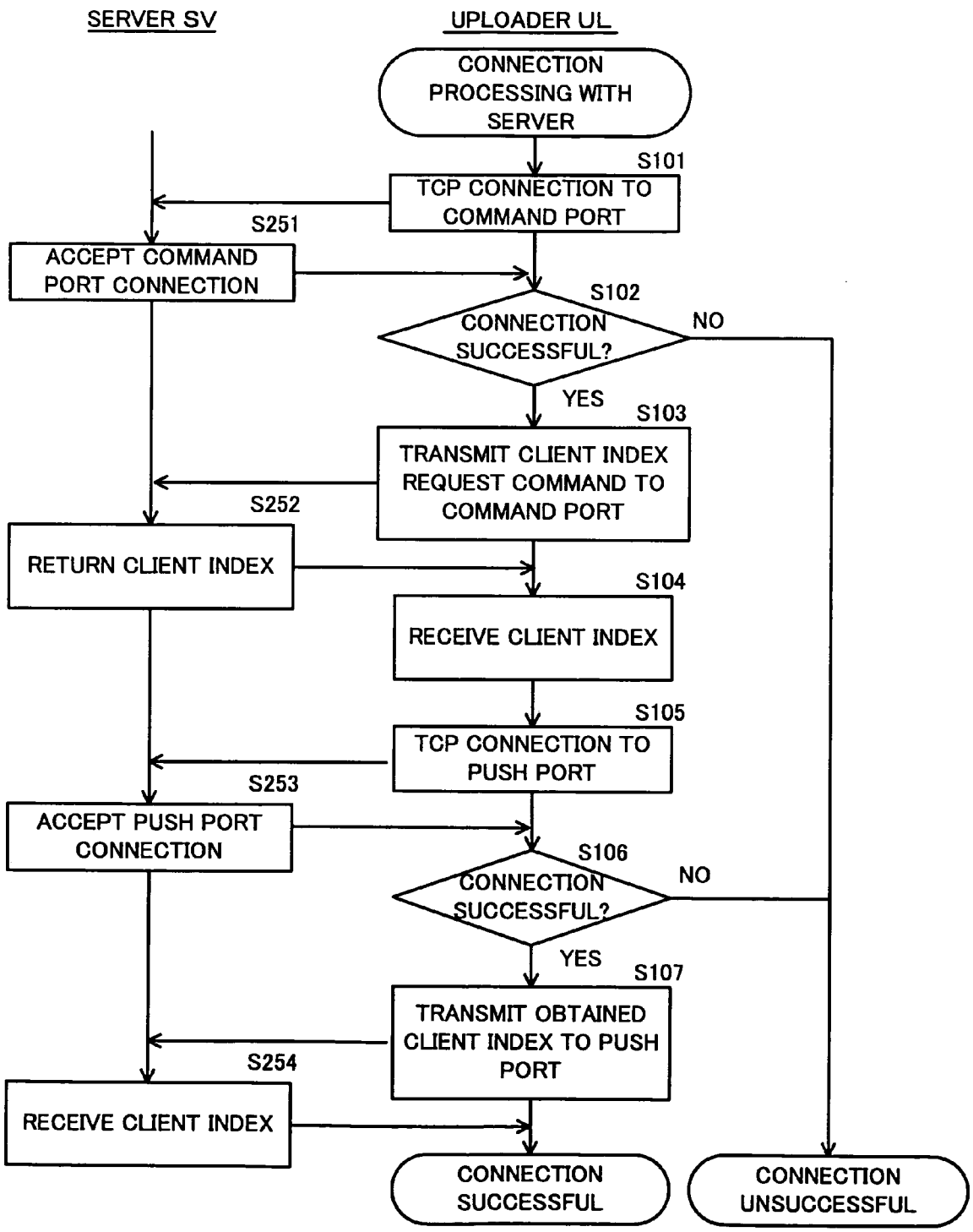
FIG. 6 is a flowchart for use in illustration of the connection operation of the uploader to the server in FIG. 1.

Referring to FIG. 6, the uploader UL produces a socket using the IP (Internet Protocol) address and the command port of the server SV according to TCP (Transmission Control Protocol) and requests connection to the server SV using the socket (S101). The command port is used to receive a command from the uploader UL to the server SV and transmit a response from the server SV to the uploader UL. The server SV accepts connection at the command port (S251), and if the connection is successful, the process proceeds to step S103 (S102). In this way, the uploader UL establishes the connection to the command port of the server SV.

The uploader UL then transmits a client index request command to the command port (S103). The server SV responds to the client index request command to return the client index from the command port to the uploader UL (S252), and the uploader UL receives the index (S104). The client index request command is a command for the uploader UL to request the server SV to provide the client index. The client index is an identifier (ID) allocated to the uploader UL from the server SV The uploader UL then produces a socket using the IP address and push port of the server SV according to TCP and requests connection to the server SV with the socket (S105). The push port is used to transmit a request from the server SV to the uploader UL. The server SV accepts connection at the push port (S253), and if the connection is successful, the process proceeds to step S107 (S106). In this way, the uploader UL establishes connection to the push port of the server SV Note however that the server SV still cannot specify whether the uploader UL or an audio client CL is connected to its push port at the point. Therefore, the uploader UL transmits the client index received in step S104 to the push port of the server SV (S107). The server SV receives the client index (S254) and specifies the device connected to the push port as the uploader UL.

2.1.2. Music Piece Data Updating Operation

Figure 7:
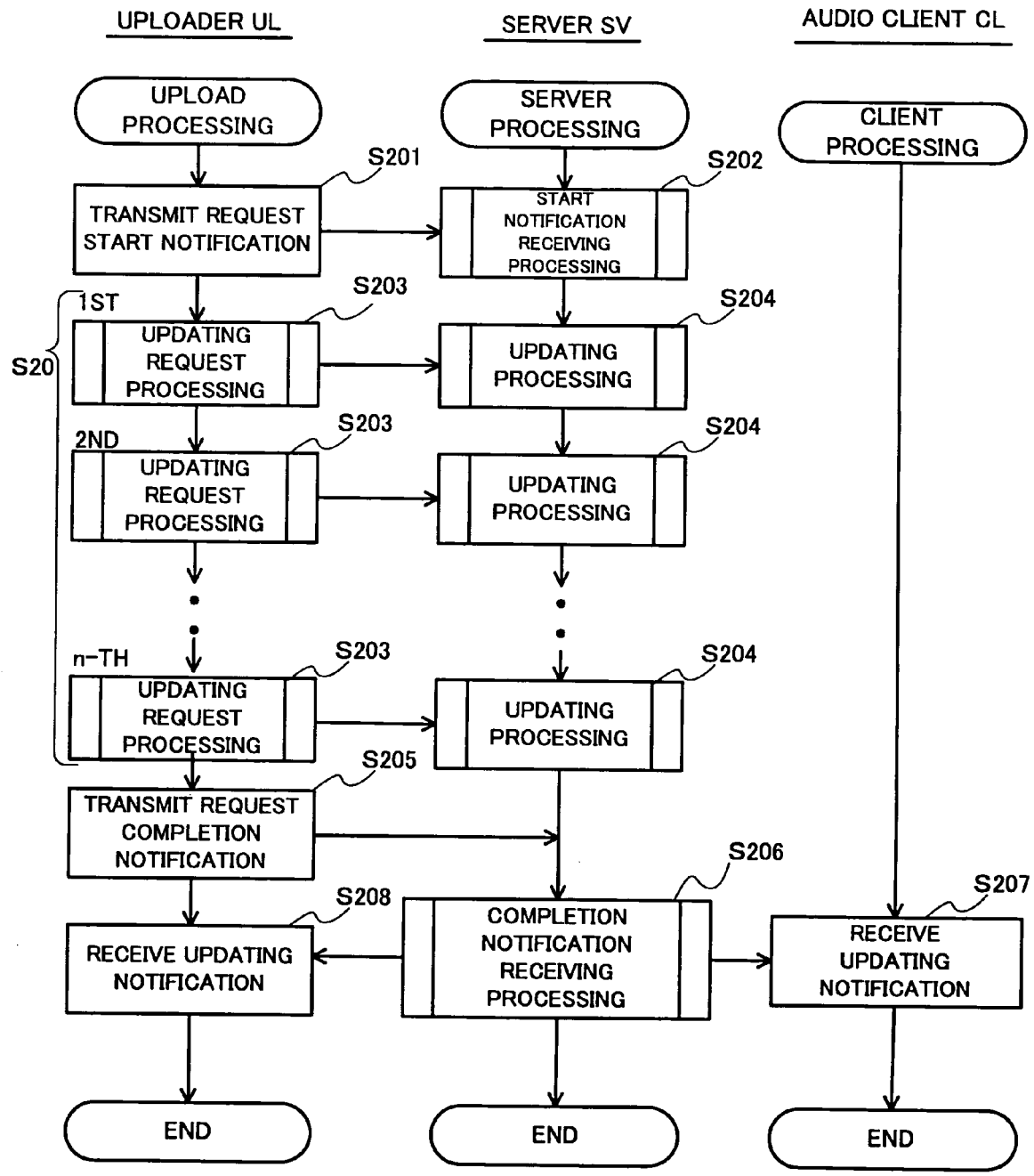
FIG. 7 is a flowchart for use in illustration of the music piece data updating operation in the network AV system in FIG. 1.

Referring to FIG. 7, the uploader UL transmits a request start notification to the server SV at the time of having the server SV register the music piece data M10 to M1n (S201). The server SV receives the request start notification and carries out start notification receiving processing (S202). The start notification receiving processing is carried out to determine that the server SV has received the request start notification from the uploader UL.

The uploader UL transmits the request start notification and then requests the server SV to register the music piece data M10 to M1n (S20). At the time, the uploader UL carries out an updating request for each piece of music piece data M1 to M1n (S203). More specifically, in order to have the server SV register the music piece data M10 to M1n, the uploader UL carries out updating request n times to the server SV (S20, S203). The server SV carries out updating processing every time it receives an updating request from the uploader UL (S204). The updating processing refers to the processing of the server SV to register music piece data M1n in the database DB of the HDD 14.

The uploader UL requests the music piece data M10 to M1n to be registered (S20) and then transmits a request completion notification to the server SV (S205). The server SV receives the request completion notification and carries out completion notification receiving processing (S206). More specifically, upon receiving the request completion notification, the server SV determines that the updating request from the uploader UL has been completed and transmits a notification (updating notification) indicating that the database DB has been updated to the audio client CL and the uploader UL (S206). The audio client CL and the uploader UL both receive the updating notification (S207, S208). Now, the start notification receiving processing in step S202, the updating request processing in step S203, the updating processing in step S204, and the completion notification receiving processing in step S206 will be described in detail.

Start Notification Receiving Processing

In step S202, a request start notification is received from the uploader UL, and it is recorded that the server SV has received the request start notification. More specifically, the server SV updates an updating status table stored in the HDD 14.

TABLE 4 updating status

| status value | status |
|---|---|
| 0 | with no request start notification |
| 1 | with request start notification, with no updated part |
| 2 | with request start notification, with updated part |

Referring to Table 4, when the status value in the updating status table is "0," the server SV has not received a request start notification from the uploader UL. When the status value is "1," the server SV has received the request start notification from the uploader UL and the database DB is not yet updated. When the status value is "2," the server SV has received the request start notification and the database DB has been updated.

Figure 8:
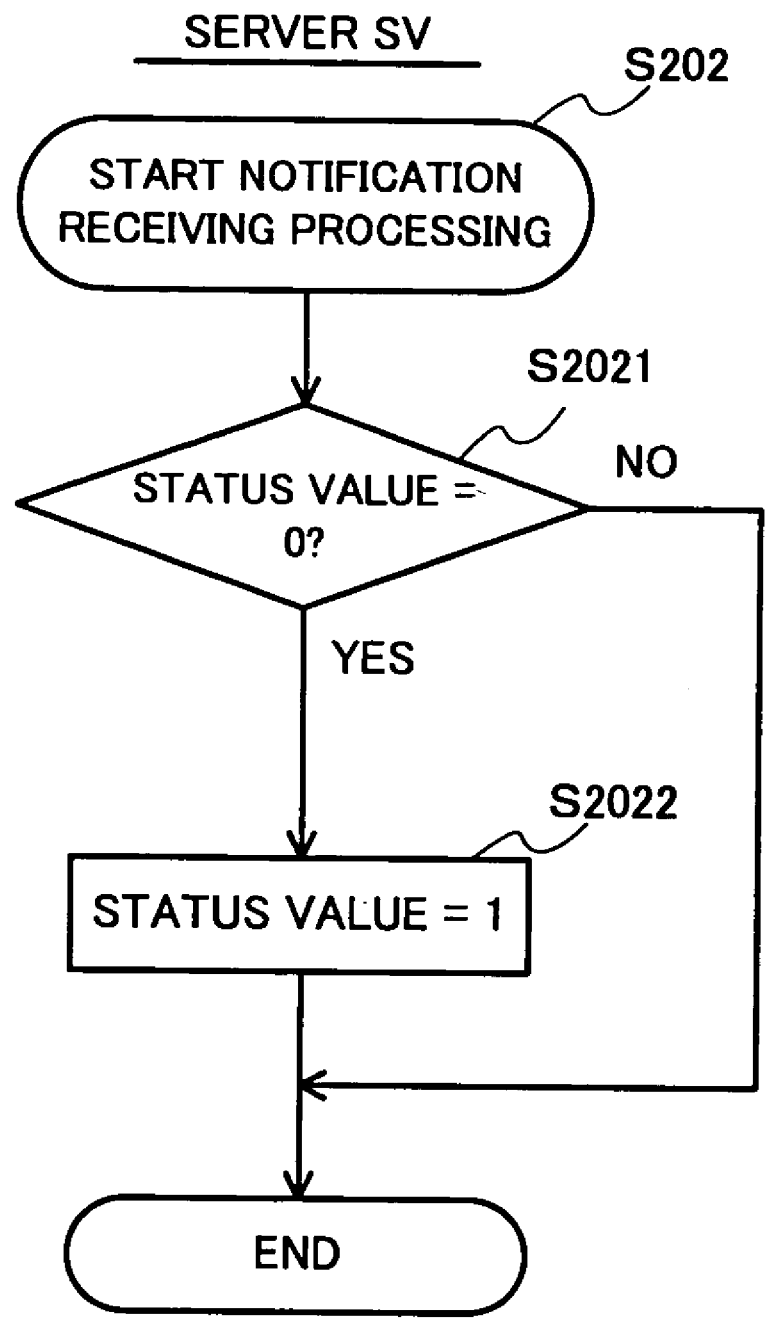
FIG. 8 is a flowchart for use in illustration of details of the operation in step S202 in FIG. 7.

Referring to FIG. 8, upon receiving the request start notification from the uploader UL, the server SV determines whether the status value in the updating status table is "0" (S2021). When the status value is "0," the status value is changed to "1" (S2022). In this way, the server SV can determine that the server SV has received the request start notification. Note that if the updating status is other than "0" based on the result of determination in step S2021, the server SV directly ends the start notification receiving processing without changing the status value.

Updating Request Processing and Updating Processing

Figure 9:
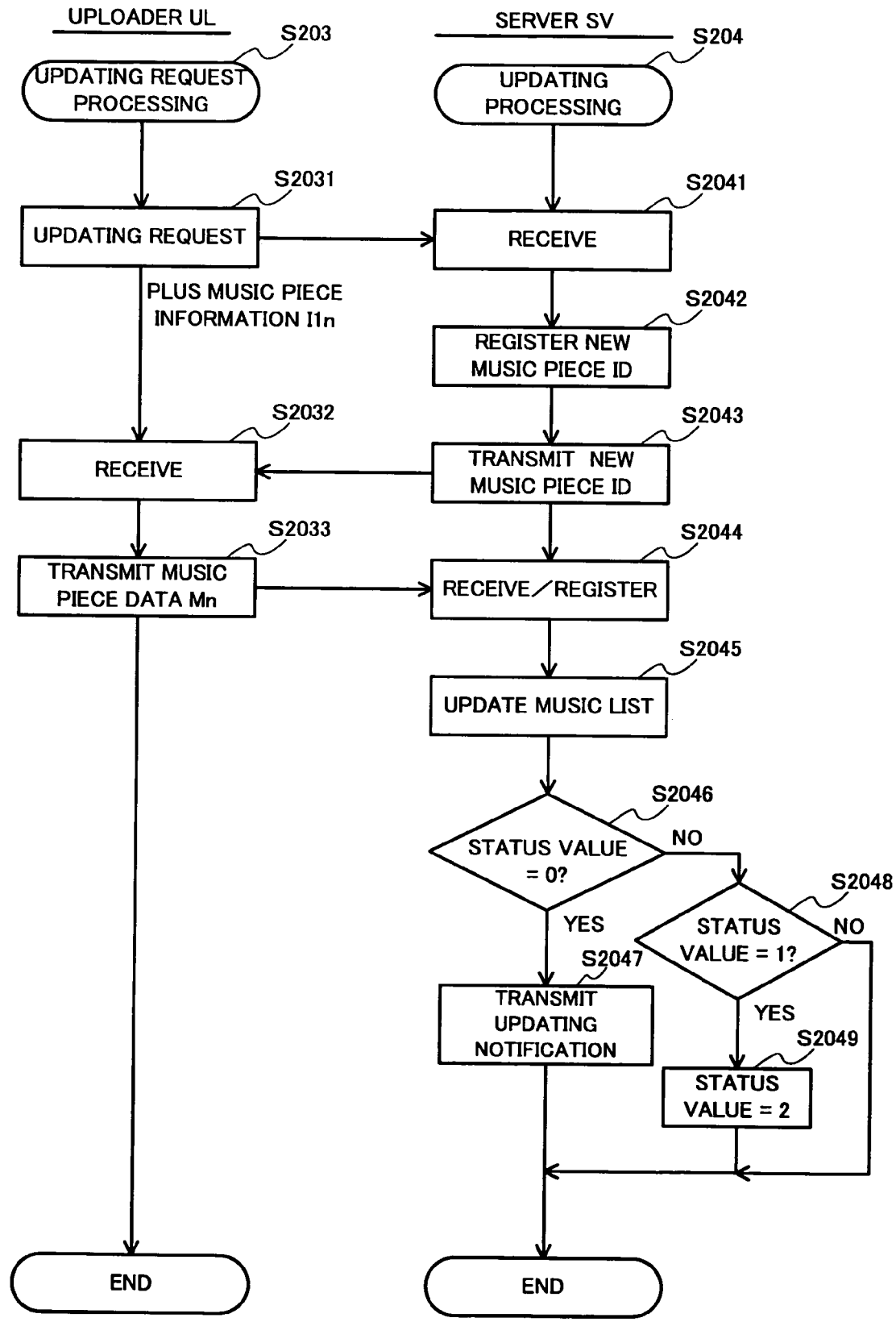
FIG. 9 is a flowchart for use in illustration of details of the operation in step S210 in FIG. 7.

Referring to FIG. 9, the uploader UL transmits to the server SV an updating request that requests music piece data M1n to be registered (S2031). At the time, the uploader UL transmits the music piece information I1n of the music piece data M1n together with the updating request.

The server SV receives the updating request (S2041) and registers a new music piece ID in the database DB in order to store the music piece data M1n (S2042). The server SV transmits the new music piece ID to the uploader UL (S2043). The uploader UL receives the new music piece ID (S2032) and transmits the music piece data M1n attached with the received new music piece ID to the server SV (S2033). The server SV receives the music piece data M1n and registers the music piece data M1n in the region of the new music piece ID in the database DB (S2044).

After registering the music piece data M1n, the server SV updates the music list ML of all the music piece data M1 to Mn (S2045). More specifically, the server SV registers the music piece information I1n of the music piece data Mm in the music piece list ML.

After updating the music piece list ML, the server SV updates the updating status table (S2046 to S2049). The server SV determines whether or not the status value in the updating status table is "0" (S2046). If the status value is not "0" based on the result of determination, the server SV determines whether or not the status value is "1" (S2048). According to the embodiment, the server SV receives a request start notification from the uploader UL (S202), and therefore the status value is normally "1." When the status value is "1," the server SV changes the status value to "2" (S2049). More specifically, the server SV records that the server SV has received the request start notification and registered the music piece data M1n.

Note that when the server SV registers any of the second and succeeding music piece data, M11 to M1n, the status value in the updating status table is already "2." Therefore, the status value based on the result of determination in step S2048 is "2" and the server SV directly ends the updating processing without changing the status value.

Completion Notification Processing

Figure 10:
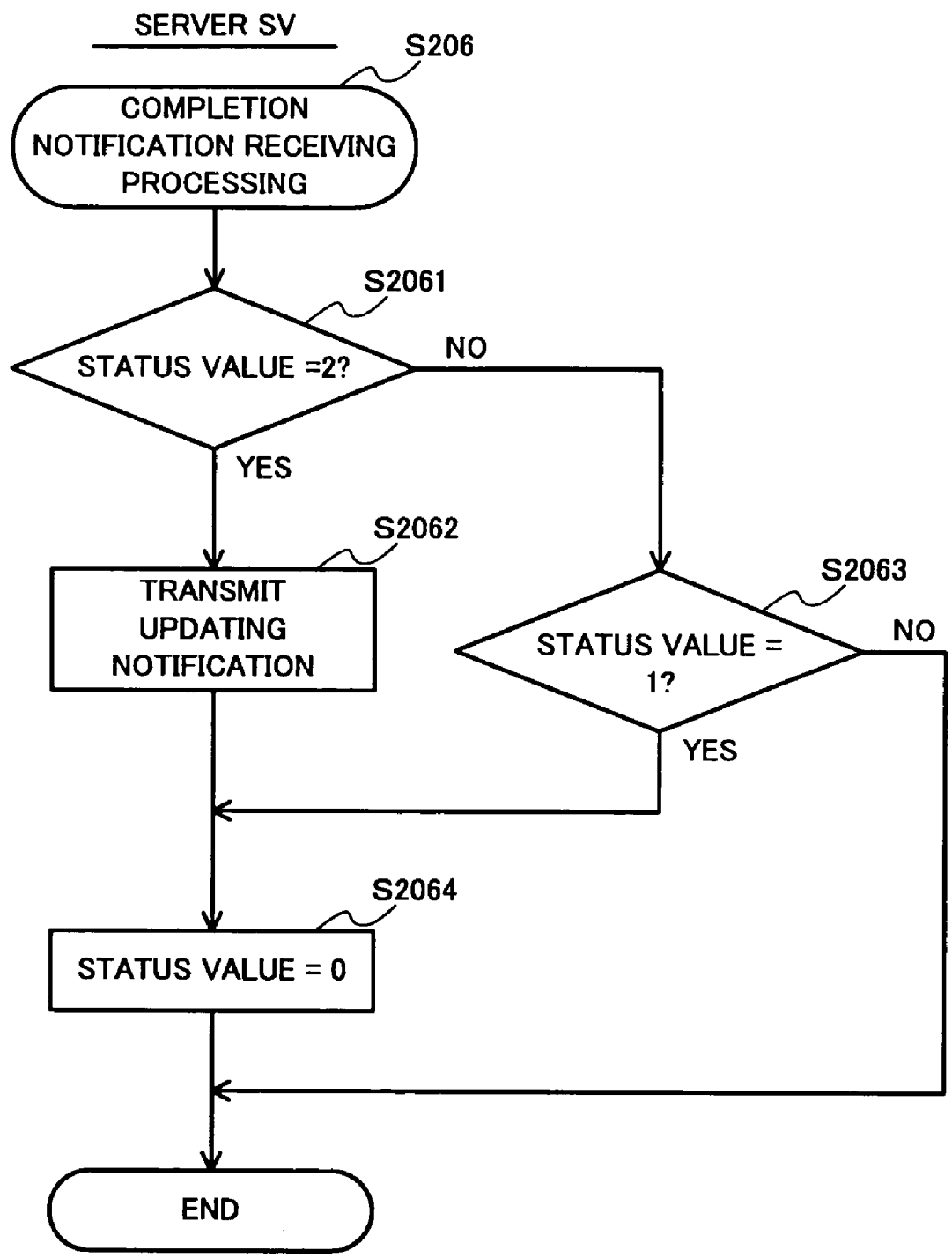
FIG. 10 is a flowchart for use in illustration of details of the operation in step S206 in FIG. 7.

After a plurality of pieces of music piece data M10 to M1n are registered in the database DB in the server SV in step S20, the server SV transmits an updating notification to the audio client CL and the uploader UL (S206). Referring to FIG. 10, the server SV determines whether the status value in the updating status table is "2" (S2061). If the status value is "2" based on the result of determination, the server SV transmits an updating notification to the audio client CL and the uploader UL (S2062). After transmitting the updating notification, the server SV returns the status value to "0" (S2064) and the completion notification processing ends.

Meanwhile, if the status value is not "2" based on the result of determination in step S2061, the server SV determines whether or not the status value is "1" (S2063). If the status value is "1" based on the result of determination, it indicates that the server SV has received a request start notification from the uploader UL but the music piece data M1n is not registered. Therefore, no updating notification is transmitted in this case and the status value is returned to "0" (S2064). Note that if the updating status value is not "1" based on the result of determination in step S2063, the updating status value is "0," and therefore the server SV directly ends the completion notification processing.

By the above described operation, the server SV transmits an updating notification after receiving a request completion notification from the uploader UL, in other words, after registering the music piece data M10 to M1n. Consequently, the traffic between the server SV and the audio client CL can be less than that in the conventional network AV system in which an updating notification is transmitted every time music piece data M1n is registered.

Furthermore, the server SV can determine its own state referring to the updating status table. More specifically, it can be determined whether or not the server SV has received a request start notification and whether the database DB has been updated based on the updating status table. Consequently, if for example the server SV has received a request start notification and the database DB has not been updated yet, no updating notification is transmitted in response to a request completion notification if any. In this way, communication is not wasted.

2.1.3 Reproducing Operation

Figure 11:
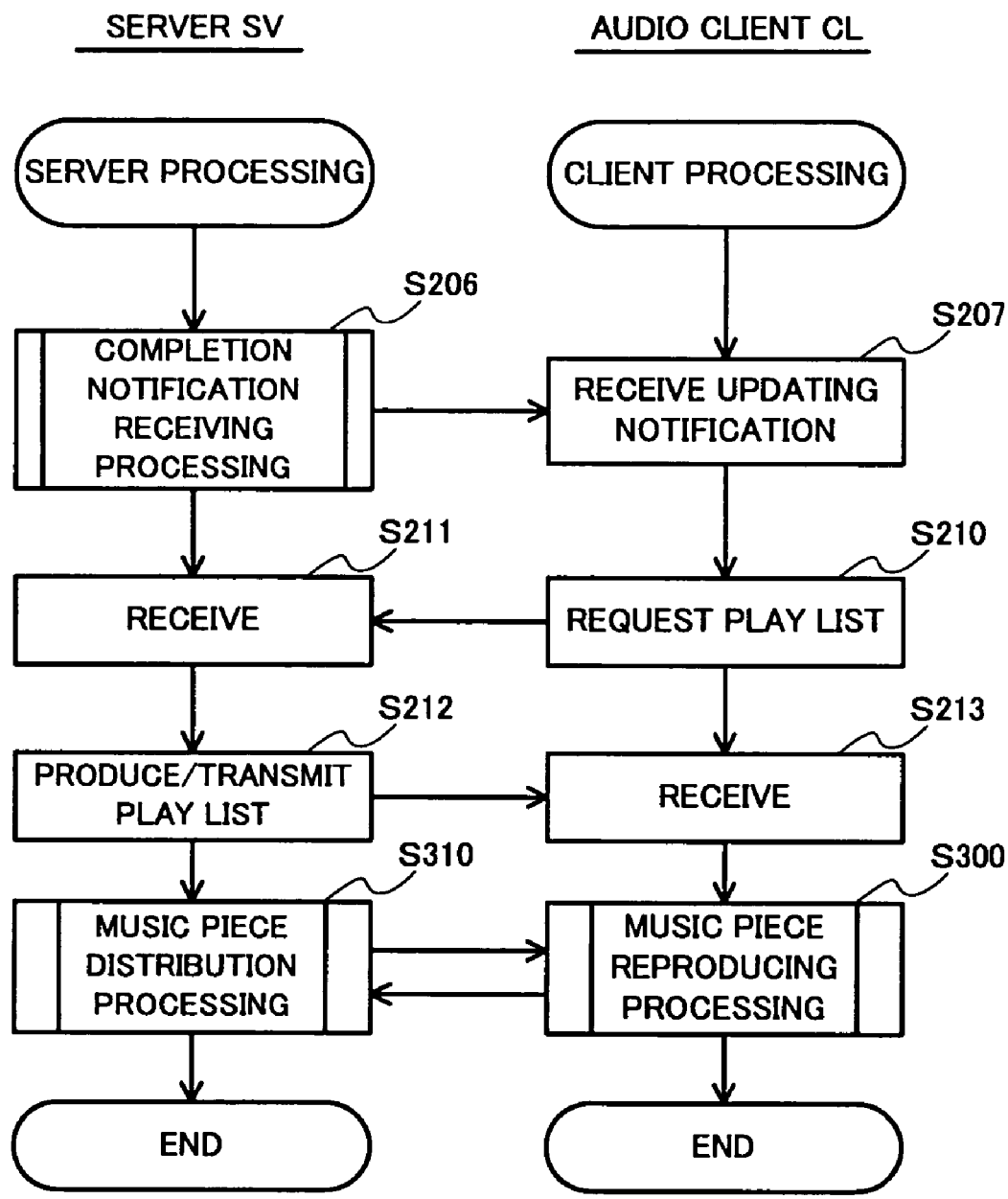
FIG. 11 is a flowchart for use in illustration of the reproducing operation in the network AV system in FIG. 1.

Referring to FIG. 11, upon receiving the updating notification from the server SV (S207), the audio client CL requests the server SV to provide a play list PL (S210). The play list PL is a list of one or more pieces of music piece information In selected by the user of the audio client CL among music piece information I1 to In in the music list ML registered in the server SV using a list construction key. When for example the user of the audio client CL desires to reproduce a music piece by an artist P, the audio client CL transmits a list request command in Table 5 in step S210.

TABLE 5

| content of request |
| --- |
| list request command |

TABLE 5-continued

| filter | artist's name |
| --- | --- |
| keyword | P |

The list request command includes a filter kind and a keyword in the list construction key. The server SV receives the list request command from the audio client CL (S211) and produces a play list PL based on the list construction key. More specifically, the server SV selects music piece information In for the artist "P" in the music list ML and produces the play list PL based on the selected one or more pieces of music piece information In. The play list PL thus produced is transmitted to the audio client CL (S212). Note that the received list construction key is registered in client information CLI in the server SV.

The audio client CL receives the play list PL (S213) and carries out music piece reproducing processing to reproduce the music piece data Mn based on the play list PL (S300). At the time, the server SV responds to a request from the audio client CL and carries out music piece distribution processing to distribute the music piece data Mn to the audio client CL (S310). Now, the music piece reproducing processing and the music piece distribution processing will be described in detail.

Figure 12:
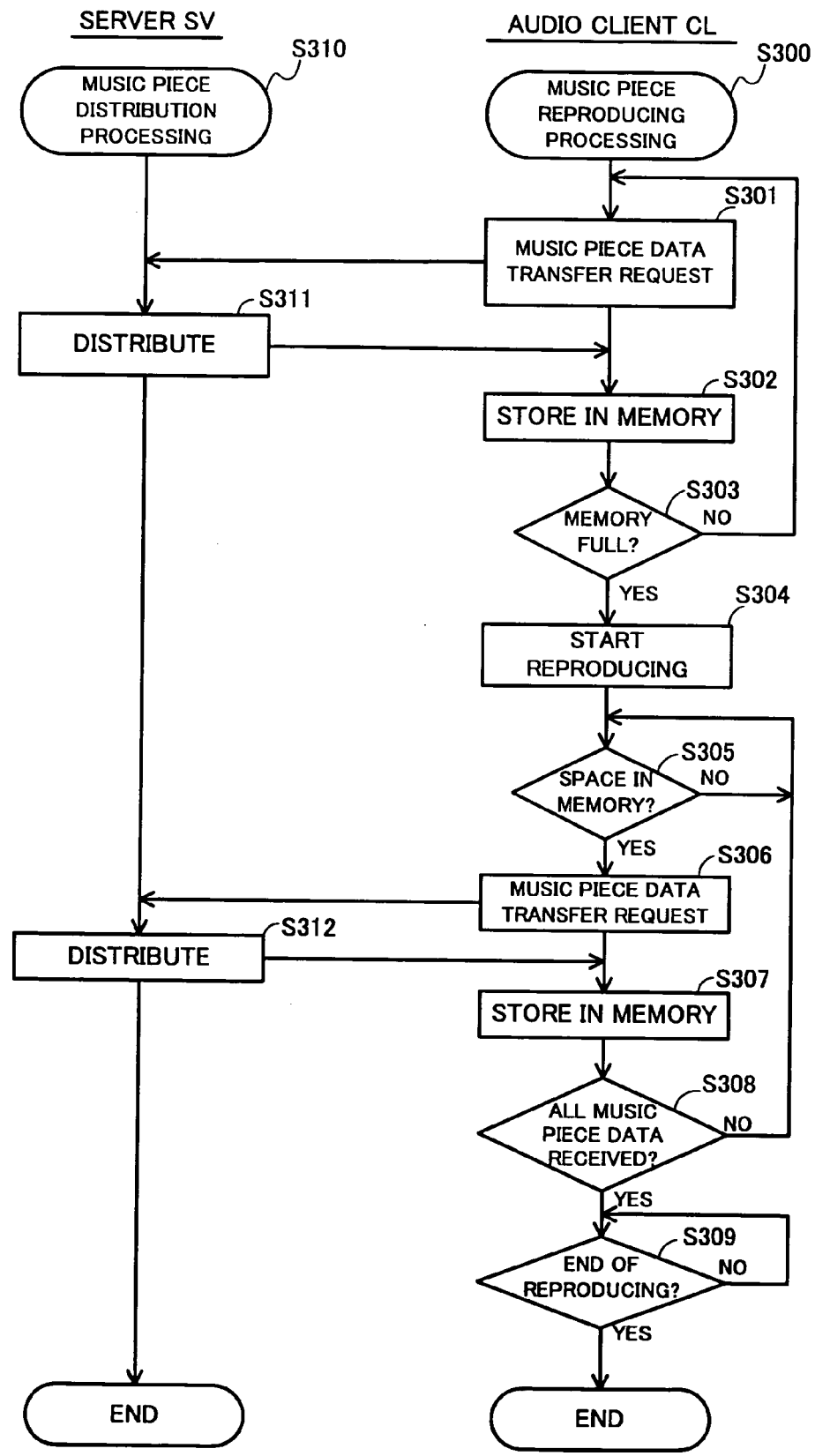
FIG. 12 is a flowchart for use in illustration of details of the operation in steps S300 and S310 in FIG. 11.

Referring to FIG. 12, the audio client transmits a music piece data transfer request command shown in Table 6 through the command port (S301).

TABLE 6

| content of request |
| --- |
| music piece data transfer request command |
| parameter     obtaining start address |
| obtaining data length |

The music piece data transfer request command includes the obtaining start address and obtaining data length of the music piece data Mn to be transferred. Note that the music piece data Mn is requested to be transferred in the order in the play list PL.

The server SV responds to the transfer request command for the music piece data Mn to distribute the part of music piece data Mn for the obtaining data length from the start address specified by the obtaining start address to the audio client CL (S311). The audio client CL stores the part of the distributed music piece data Mn in the memory 32. The memory 32 includes a plurality of buffers. The audio client CL obtains music piece data for the amount of one buffer from the start of the music piece (that equals the obtaining data length) based on the music piece data transfer request command and stores the obtained data (S302). After storing the data, the audio client CL determines whether all the buffers in the memory 32 have been filled with music piece data (S303) and obtains and stores music piece data until all the buffers are filled with data.

The process from steps S301 to S303 is repeated and if all the buffers are filled with music piece data, the audio client CL starts to reproduce the data (S304). More specifically, the client starts to output music piece data from the starting buffer in the memory 32 to the audio sound processing portion 34. As the music piece data continues to be output for reproducing, an empty space for one buffer is created in the memory 32 (S305). Then, the audio client CL again transmits a music piece data transfer request to the server SV (S306), and the server SV distributes the requested amount of the music piece data (S312). The audio client CL stores the distributed music piece data in the empty buffer in the memory 32 (S307). After storing the data, the audio client CL determines whether the entire music piece data Mn has been received (S308). If the entire music piece data Mn has not been received, in other words, if the server SV has not yet distributed the entire music piece data Mn to the audio client CL, steps S306, S312, and S307 are repeated by the audio client CL and the server SV every time a space is created in the memory 32. Note that in the above example, the music piece data starts to be reproduced once all the buffers are filled with music piece data, but the reproducing may be started before all the buffers are filled with the data.

When the audio client CL has received the entire music piece data Mn from the server SV (S308), the audio client CL continues to reproduce until the entire music piece data Mn is reproduced (S309). Note that upon completing reproducing the music piece data Mn, the audio client CL transmits to the server SV a transfer request for the next music piece data Mn based on the play list PL.

2.2. When Uploader has Server Register Only One Piece of Music Piece Data

Referring back to FIG. 7, when the uploader UL has the server SV register only music piece data M10, the updating request processing in step S20 (S203) is carried out only once. At the time, the uploader UL does not transmit a request start notification in step S201. More specifically, the uploader UL starts from the operation in step S203. Therefore, the server SV does not carry out the start notification receiving processing in step S202 and the status value in the updating status table remains to be "0." The updating processing (S204) by the server SV at the time will be described.

Referring to FIG. 9, the operation between when the server SV receives an updating request from the uploader UL and when the server SV updates the music list ML (S2041 to S2045) is the same as the above case in 2.1.2. (the same as the case of registering the music piece data M10 to M1n in the server SV).

After updating the music list ML, the server SV determines whether or not the status value in the updating status table is "0" (S2046). At the time, the status value is "0," and therefore the server SV transmits an updating notification to the client CL (S2047). More specifically, when the uploader UL requests only the music piece data M1n to be registered, the server SV transmits an updating notification upon registering the music piece data M1n even if it receives no request completion notification. Note that at the time, the uploader UL does not transmit a request completion notification (S205) either.

If the uploader UL transmits a request start notification and a request completion notification at the time of registering only the music piece data M1n, the traffic on the LAN 10 increases. Therefore, in the network AV system according to the embodiment, when only one piece of music piece data M1n is registered, the server SV can transmit an updating notification without a request start notification or a request completion notification from the uploader UL, so that the traffic is prevented from increasing.

Note that the server SV according to the embodiment can operate with the conventional uploader. More specifically, the conventional uploader does not transmit a request start notification or a request completion notification to the server SV. Therefore, upon receiving a registration request for music piece data M10 to M1n from the conventional uploader, the server SV transmits an updating notification every time data for one music piece is registered.

The above description of the network AV system 1 according to the embodiment is about how the music piece data M1n is registered. Meanwhile, the same operation is carried out when the music piece information In of the music piece data Mn is changed or the music piece data Mn is deleted. Note that the operation of deleting the music piece data Mn may simply be carried out by specifying the music piece data Mn to be deleted, and therefore the uploader UL does not carry out the updating request processing (S203) to transmit the music piece data Mn. When the music piece information In of the music piece data Mn is changed, the uploader UL does not transmit the music piece data Mn but transmits the music piece information In to be changed together with a request start notification (S201).

In the above description of the embodiment, the contents are music piece data, but the same applies to video data and/or picture data.

Although the embodiment of the present invention has been described and illustrated in detail, it is clearly understood that the same is by way of illustration and example only and is not to be taken by way of limitation. Therefore, various changes and modifications may be made therein without departing from the scope of the invention.

What is claimed is:

1. A network AV system, comprising:
a server having a database capable of storing a plurality of contents;
an uploader capable of connecting to said server and requesting said server to update the database; and
a client capable of connecting to said server, receiving a content selected among said plurality of contents from said server, and reproducing the selected content,
said uploader comprising:
a request start notifier transmitting a request start notification to said server;
an updating requester transmitting to said server a plurality of updating requests to update the database after said request start notifier transmitting the request start notification; and
a completion notifier transmitting a request completion notification to said server after said updating requester transmits the plurality of updating requests,
said server comprising:
an updater responsive to the plurality of updating requests and updating the database;
a recorder recording a receipt of the request start notification when receiving the request start notification;
a determiner determining whether or not the receipt of the request start notification has been recorded when receiving the request completion notification; and
an updating notifier transmitting an updating notification to said client when said determiner determines that the receipt of the request start notification has been recorded, the updating notification indicating that the database has been updated.

2. The network AV system according to claim 1, wherein said client comprises:
an obtainer obtaining information related to the selected content from said server upon receiving the updating notification; and
a requester requesting said server to provide the selected content based on the information.

3. The network AV system according to claim 1, wherein said determiner further determines whether or not the database has been updated, and
said updating notifier transmits the updating notification when said determiner determines that the receipt of the request start notification has been recorded and the database has been updated.

4. A server capable of connecting to an uploader and a client, comprising:

a database capable of storing a plurality of contents;

an updater responsive to a plurality of updating requests for the database transmitted from said uploader and updating the database;

a recorder recording a receipt of the request start notification when receiving the request start notification;

a determiner determining whether or not the receipt of the request start notification has been recorded when receiving the request completion notification indicating the completion of the updating request from said uploader; and an updating notifier transmitting an updating notification to said client when said determiner determines that the receipt of the request start notification has been recorded, said updating notification indicating that the database has been updated.

5. The server according to claim 4, wherein said determiner further determines whether or not the database has been updated, wherein said updating notifier transmits the updating notification when said determiner determines that the receipt of the request start notification has been recorded and the database has been updated.

6. A computer program product causing a server capable of connecting to an uploader and a client to perform the steps of:

updating a database in response to a plurality of updating requests for the database transmitted from said uploader;

recording a receipt of the request start notification when receiving the request start notification;

determining whether or not the receipt of the request start notification has been recorded when receiving the request completion notification indicating the completion of the updating request from said uploader; and transmitting an updating notification to said client when said determiner determines that the receipt of the request start notification has been recorded, the updating notification indicating that the database has been updated.

7. The computer program product according to claim 6, further causing said server to perform the step of determining whether or not the database has been updated, wherein said step of transmitting transmits the updating notification when said determiner determines the receipt of the request start notification has been recorded and that the database has been updated.

* * * * *